(No Model.)

H. A. BERGER.
ROLLER BEARING.

No. 542,869.  Patented July 16, 1895.

WITNESSES:
Gustave Dieterich.
John Kihlenbeck.

INVENTOR
Henry A. Berger,
BY
Albert H. Norris.
ATTORNEY.

UNITED STATES PATENT OFFICE.

HENRY A. BERGER, OF BROOKLYN, NEW YORK.

ROLLER-BEARING.

SPECIFICATION forming part of Letters Patent No. 542,869, dated July 16, 1895.

Application filed June 10, 1895. Serial No. 552,210. (No model.)

*To all whom it may concern:*

Be it known that I, HENRY A. BERGER, a citizen of the United States, residing at Brooklyn, in the county of Kings and State of New York, have invented new and useful Improvements in Roller-Bearings, of which the following is a specification.

This invention relates generally to antifriction roller-bearings for the fifth-wheels of vehicles, turn-tables, and various other purposes, particularly that type of roller-bearings wherein a series of links pivotally connected together at their ends are provided between their boundary edges with orifices in which rotatable bearings or rollers are arranged so that the rotatable bearings or rollers project above and below the upper and lower surfaces of the pivotally-connected links.

The objects of my invention are to improve the prior construction of chain-link roller-bearings above referred to; to provide a novel, simple, efficient, and economical construction whereby the chain-link roller-bearing will be practically noiseless in operation and friction be largely reduced by avoiding contact between the peripheries of the rotatable bearings or rollers and the edges of the orifices in the chain-links in which the rotatable bearings or rollers are arranged, and to avoid the wearing of channels or grooves in the circle-irons of the fifth-wheel, turn-table, or other object, as occurs where the rotatable bearings are spherical, or in the form of balls or spheres.

To accomplish all these objects my invention consists, essentially, in a roller-bearing composed of a plurality of pivotally-connected links formed with laterally-projecting ears or lugs and having orifices between their boundary edges and rotatable bearings arranged in said orifices and having journals supported by the laterally-projecting ears or lugs of the pivotally-connected links.

The invention is illustrated by the accompanying drawings, in which—

Figure 1:
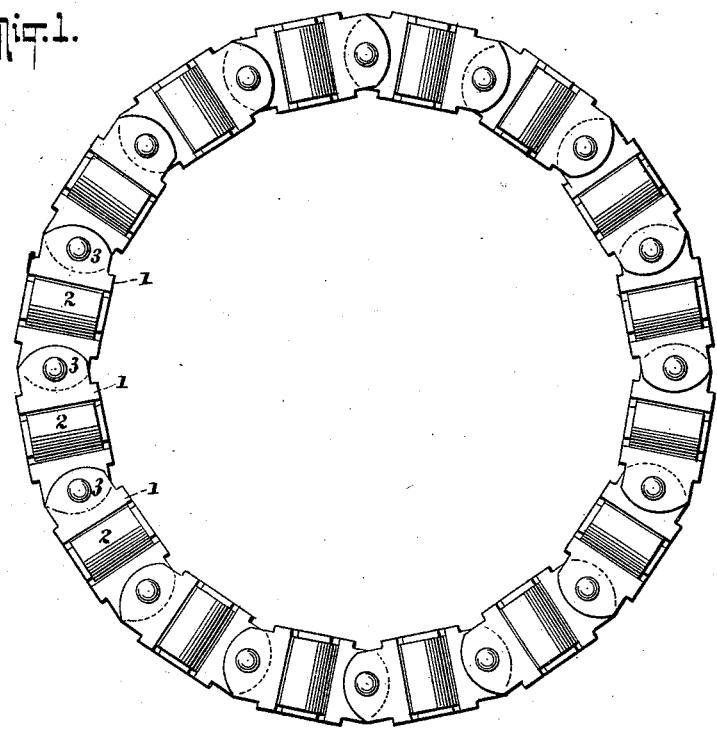
Figure 2:
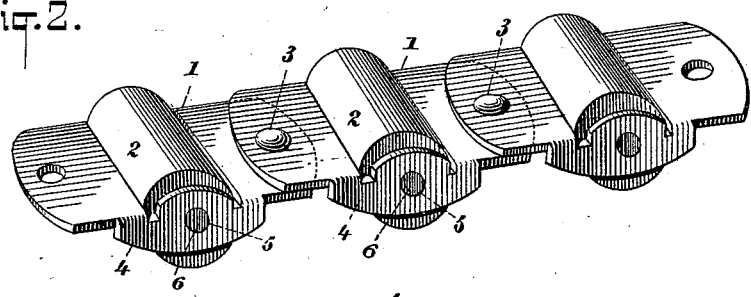

Figure 1 is a plan view of a circular roller-bearing constructed in accordance with my invention. Fig. 2 is a detail perspective view showing some of the links of the improved bearing, and Fig. 3 is a plan view of one of the blanks prior to bending the same to form the laterally-projecting ears or lugs.

In order to enable those skilled in the art to make and use my invention, I will now describe the same in detail, referring to the drawings, wherein—

The numerals 1 indicate links, each composed of a flattened metallic plate constructed between its boundary edges with a rectilinear orifice, in which a rotatable bearing 2 is arranged. The rotatable bearing, as here illustrated, is in the form of a section of a cylinder; but I do not wish to be understood as confining myself to the exact form of rotatable bearing illustrated in the drawings. The chain-links are pivotally connected together by overlapping their ends and passing therethrough suitable rivets or pivot-pins 3, so that a flexible chain-like structure is provided.

Figure 3:
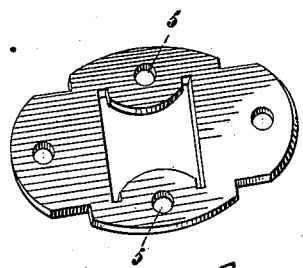

The plates constituting the chain-links of the improved roller-bearing are cut or stamped from a sheet of steel or any other metal suitable for the purpose in hand, so that each link-blank is of the form shown in Fig. 3, after which the side portions of each blank are bent laterally to form the laterally-projecting ears or lugs 4. The laterally-projecting ears or lugs 4 are provided with orifices 5 to receive the journals 6 of the rollers 2, whereby the journals of the rollers are supported by the ears or lugs.

The journals of the rollers are so arranged and mounted in the ears or lugs that the periphery of each roller projects above and below the upper and lower surfaces of a link. The lower sides of the rollers are adapted to rest and travel upon the lower plate or section of a fifth-wheel, turn-table, or other similar object, while the upper sides of the rollers are adapted to rest and travel against the upper plate or section of the fifth-wheel, turn-table, or other object.

The arrangement of the rotatable bearings in the orifices of the chain-links and the provision of journals on the rotatable bearings, which are supported by the laterally-projecting ears or lugs of the links, reduce to a minimum the noise incident to the practicable operation of chain-link roller-bearings of the character to which my invention relates. The friction is also very largely reduced in that the peripheries of the rotatable bearings do not come in contact with opposite edges of the orifices in the links, as in the prior construction, where balls or rollers are retained in operative connection with chain-links by the edges of the orifices bearing against the peripheries of the balls or rollers.

By the construction of a chain-link roller-bearing of the character referred to, wherein each link is composed of a single plate only, the cost of manufacture of this type of devices is materially reduced and a superior roller-bearing is obtained.

The construction of the rotatable bearings in the form of cylinders, or approximately of such form, prevents the formation of channels or grooves in the circle-irons of a fifth-wheel, a turn-table, or other object, as occurs where the rotatable bearings are spherical or in the form of balls or spheres.

A chain-link ball-bearing of the character described and shown is very advantageous and desirable in that the link-plates can be rapidly produced. Any number of links may be connected to produce a chain of indefinite length, and this chain can be subsequently divided into sections of definite extent to form endless bands or chains suitable for circular parts of any diameter. Therefore it is possible to construct a roller-bearing for a very large turn-table, as well as a roller-bearing for the fifth-wheel of a vehicle, without mathematically laying off circular plates or rings of varying diameter and arranging ball or roller seats in such circular plates or rings.

The improved ball-bearing is more particularly designed to be used in the form of a circle or ring, but obviously it can be of other suitable form, according to the conditions required at the place where the bearing is to be applied.

Having thus described my invention, what I claim is—

1. A roller-bearing, consisting of a plurality of pivotally connected links having laterally projecting ears or lugs, and orifices between their boundary edges, and rotatable bearings arranged in said orifices and having journals supported by the laterally projecting ears or lugs of the pivotally connected links, substantially as described.

2. A roller-bearing, consisting of a plurality of links lapping at their extremities and connected by pins or rivets, and each link formed integral with laterally projecting ears or lugs, and orifices between its boundary edges, and cylindrical rotatable bearings arranged in said orifices and having journals supported by the laterally projecting ears or lugs of the connected links, substantially as described.

In testimony whereof I have hereunto set my hand in presence of two subscribing witnesses.

HENRY A. BERGER.

Witnesses:
 JOSEPH NITSCH,
 JOHN C. KERNS.